No. 741,253. PATENTED OCT. 13, 1903.
F. LAMBERT.
WATER METER.
APPLICATION FILED APR. 28, 1902.
NO MODEL.
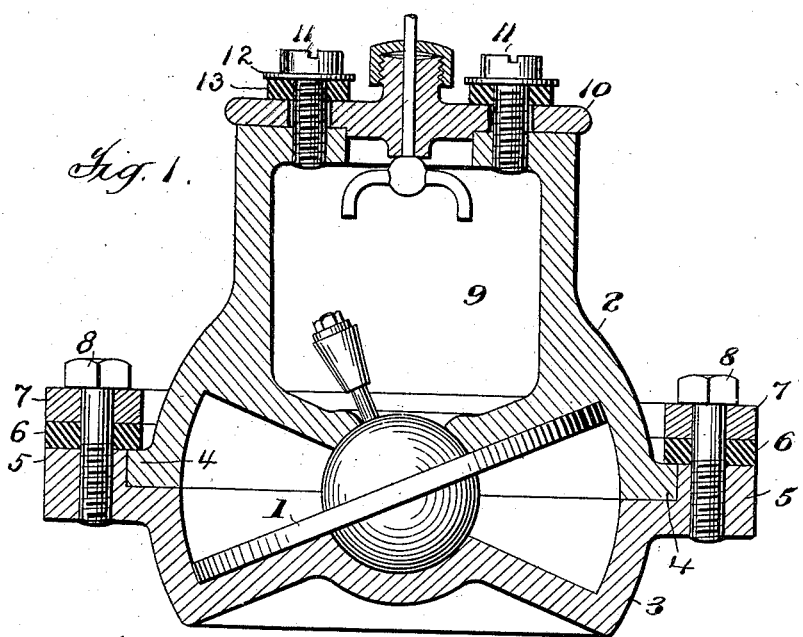
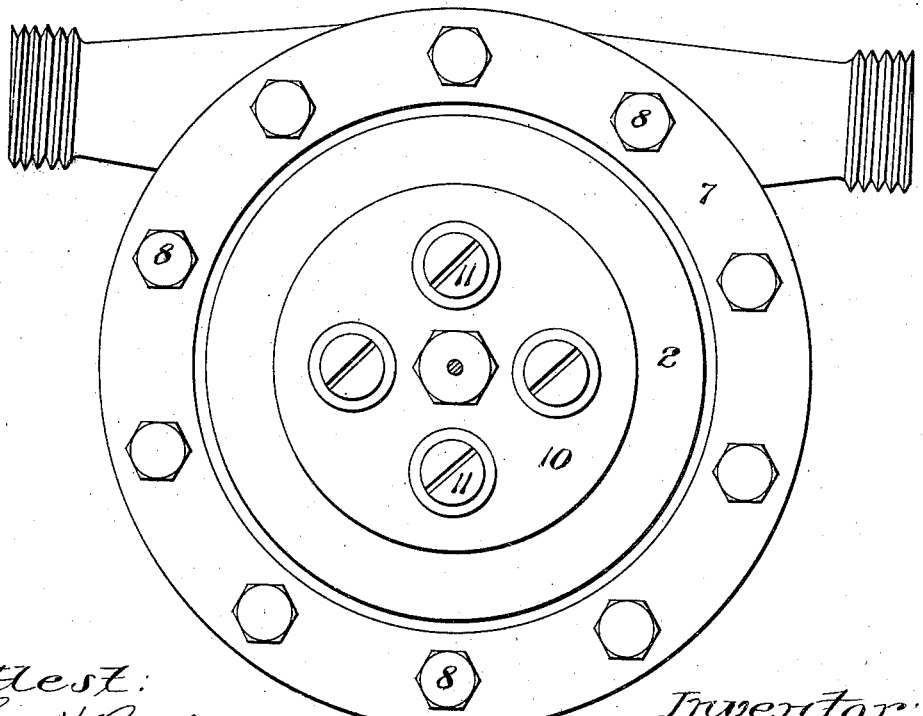

No. 741,253. Patented October 13, 1903.

UNITED STATES PATENT OFFICE.

FRANK LAMBERT, OF BROOKLYN, NEW YORK.

WATER-METER.

SPECIFICATION forming part of Letters Patent No. 741,253, dated October 13, 1903.

Application filed April 28, 1902. Serial No. 105,063. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and more particularly to meters having a nutating disk piston.

The object of this invention is to construct a simple but efficient meter the content or cubic interior space of which will be constant under water-service pressure, but will increase under undue internal pressure, and thus prevent distortion or bursting when the contents of the meter freezes.

In the accompanying drawings a meter is shown embodying my improvements; but I do not limit myself to the particular form shown nor to the particular construction of the parts for carrying out my invention.

Figure 1 is a central sectional elevation of a meter made according to my invention, the reducing-gear and register not being shown. Fig. 2 is a plan view of Fig. 1.

By this invention I form the pressure and measuring chamber, in which the disk piston 1 works in the well-known manner, of two sections 2 and 3, held in intimate contact by external elastic means adapted to allow the sections to be moved apart under undue internal pressure due from various causes—such as expansion from freezing, accidental obstruction between the disk and the frustum of the cone of the measuring-chamber, hydraulic ram causing water-hammer, &c. Section 2 has a flange at 4, which is seated in a recess in the flange 5 of section 3. A thick gasket 6, of resilient or elastic material, is placed over the flanges 4 and 5, as shown, and is held down by a ring 7, of suitable rigid material, and bolts 8. The pressure of the gasket 6 against the upper faces of the flanges 4 and 5 maintains a water-tight joint between the sections. The bolts 8 are tightened sufficiently to give an amount of tension to the resilient gasket great enough to hold the sections 2 and 3 in intimate face contact and keep the content of the measuring-chamber constant under normal internal water-service pressure, while leaving the sections free to part, and increase the content under undue internal pressure, the section 2 then further compressing the gasket 6 between its flange 4 and the rigid ring 7. The content or internal cubic space of the measuring-chamber may thus be made to vary under different internal pressures without destroying the water-tight joint made by the pressure of the gasket 6 against the flanges 4 and 5. Also when the normal internal pressure is resumed the gasket 6 will force the adjacent faces of the two sections into intimate contact again.

The chamber 9 for containing the reducing-gear is formed in the upper part of section 2 and is closed by a head 10, held in position against internal pressure by resilient means capable of preventing the head from lifting under water-service pressure, but allowing it to lift under supernormal internal pressure. Such resilient means may consist of bolts 11, rigid washers 12, and elastic gaskets 13, the said bolts passing freely through the said washers, the gaskets, and the closing-head 10. The bolts are tightened to compress the gaskets 13 between the washers 12 and head 10 and maintain the head in intimate contact with section 2 under water-service pressure; but under supernormal pressure the gaskets may be further compressed by the head rising, so that the content of the gear-chamber is increased.

I claim as my invention—

1. In a water-meter, a combined pressure and measuring chamber whose component sections are secured together by resilient means capable of maintaining a water-tight joint with each section in the various relative positions of said sections permitted by the resiliency of said means.

2. In a disk water-meter, a gear-chamber, a head closing the upper end of said chamber, and resilient means adapted to hold the head in position against internal pressure, the tension on said head due to said resilient means being great enough to prevent said head from lifting under water-service pressure, but allowing said head to lift when there is undue pressure in the said chamber.

In testimony whereof I have signed my name to this specification in the presence of two subscribing witnesses.

FRANK LAMBERT.

Witnesses:
EDITH J. GRISWOLD,
MABELLE F. LAKE.